United States Patent [19]

Franczak et al.

[11] Patent Number: 5,832,869
[45] Date of Patent: Nov. 10, 1998

[54] PRE-FILLED DISPOSABLE CARDBOARD PET LITTER CONTAINER

[76] Inventors: Richard M. Franczak, 334 Lea Ave., Laurence Harbor, N.J. 08879; Alan M. Dunich; Bernadette M. Dunich, both of 45 Hawthorne Rd., Sicklerville, N.J. 08081

[21] Appl. No.: 604,107

[22] Filed: Feb. 20, 1996

[51] Int. Cl.⁶ .................................................. A01R 29/00
[52] U.S. Cl. ........................................ 119/168; 119/165
[58] Field of Search ........................... 119/161, 165–168, 119/171, 172; 229/198.1

[56] References Cited

U.S. PATENT DOCUMENTS

| | | | |
|---|---|---|---|
| 4,120,444 | 10/1978 | Gray | 229/198.1 |
| 4,271,787 | 6/1981 | Wellman et al. | 119/168 |
| 4,463,895 | 8/1984 | Pasquale | 229/198.1 |
| 4,548,160 | 10/1985 | Feitelson | 119/168 |
| 4,553,671 | 11/1985 | Cheeseman | 119/168 |
| 4,648,349 | 3/1987 | Larson | 119/168 |
| 4,739,725 | 4/1988 | Fonnelly | 119/168 |
| 5,123,381 | 6/1992 | Salmon | 119/165 |
| 5,295,632 | 3/1994 | Zink et al. | 229/198.1 |
| 5,566,641 | 10/1996 | Radli et al. | 119/168 |

FOREIGN PATENT DOCUMENTS

0386391  9/1990  European Pat. Off. .

*Primary Examiner*—John G. Weiss
*Assistant Examiner*—David J. Cho
*Attorney, Agent, or Firm*—Ezra Sutton

[57] ABSTRACT

A disposable pet litter container having litter material therein and formed from a cardboard blank including: a rectangular bottom wall having integrally attached opposing side panels and end panels; a pair of opposing inner and outer folding side walls being integrally attached to each of the opposing side panels; and a pair of opposing inner and outer folding end walls being integrally attached to each of the opposing end panels. In addition, the disposable pet litter container includes a pair of opposing outer locking corner panels attached to each of the opposing end panels; a pair of opposing corner closure devices attached to each of the inner folding end walls for the formation of an anti-scattering component; and a plurality of pull tabs for unfolding the inner side folding walls and the inner end folding walls. The container is formed by connecting the outer locking corner panels of the opposing end panels to the opposing side panels. The pet litter container is filled with a predetermined amount of pet litter material and has a cover member for sealing the container.

9 Claims, 8 Drawing Sheets

PRE-FILLED DISPOSABLE CARDBOARD PET LITTER CONTAINER

FIELD OF THE INVENTION

This invention relates to a cardboard pet litter container, and more particularly, the pet litter container includes a pre-filled, disposable, absorbent pet litter wherein a plurality of litter containers are stackable.

BACKGROUND OF THE INVENTION

Disposable pet litter containers having pre-packed litter material contained therein have taken many forms in relation to construction, shape, and materials used. Typically, disposable pet litter containers have been made of water-resistant cardboard, or light-weight plastic materials, or a combination of both cardboard and plastic. Disposable containers having litter material have been used on a limited basis because of difficulties in preparation for use and disposability, ineffective container designs, and cost. Present disposable containers have a number of disadvantages such as the following:

1. Inadequate depth of litter;
2. Insufficient container wall height to prevent scattering of the litter over the edges of the container by the pet during usage;
3. Inability to catch the scattered litter in the surrounding area of the litter container when in use;
4. Insufficient anti-scattering measures incorporated within the container;
5. Instability of the container structure and not being strong enough;
6. Leakage of litter at the corners of the containers;
7. Unreliability of the container to retain litter material, defecated matter and urine within the container;
8. Nonstackable and non-nestable structure which prevents the nesting of several containers for shipping;
9. An unsanitary and inefficient method of disposal of the used litter material; and
10. An uneconomical and excessively expensive disposable pet litter container for use by consumers.

There remains a need for a disposable pet litter container having a pre-packed quantity of pet litter material contained therein wherein the container has the strength and construction to be nested for shipping, displaying, and storing. In addition, other desirable design features should include anti-scattering measures for the prevention of litter material being ejected by a pet from the container when in use; the prevention of urine and litter leakage from the corners of the pet container when in use; and an easily re-sealable cover for a secure, leakage-proof disposal of the pet container by the user.

DESCRIPTION OF THE PRIOR ART

Disposable pet litter containers having pre-packed litter material contained within a sealed box have been disclosed in the prior art. For example, U.S. Pat. Nos. 4,164,314; 4,501,226; 4,553,671; 4,648,349; 4,846,105; and 5,123,381 all disclose disposable pet litter boxes, containers and packages for the collection of pet secretions and are made from cardboard die-cut blanks having various shapes.

None of the aforementioned prior art patents disclose a pet litter container having the particular combination of features and structure of the present invention, including structural design and strength of construction for nestability; nor do they disclose structure for the prevention of scattering of litter material as in the present invention; nor do they disclose structure for the prevention of leakage of urine or litter material from the corners of the container as in the present invention.

Accordingly, it is an object of the present invention to provide a disposable pet litter container having a new and improved structurally fortified design which provides nestability for a plurality of pet litter containers that are to be shipped, displayed and stored.

Another object of the present invention is to provide a pet litter container having interior slanted walls with integrally attached single or double folding walls for providing improved stability, greater strength and nestability to the containers.

Another object of the present invention is to provide a pet litter container with double folding walls for better sealing of the cover lid to the interior area of the container.

Another object of the present invention is to provide a pet litter container with double folding walls having pull tabs for ease of opening the container by the consumer.

Another object of the present invention is to provide a pet litter container with single or double folding walls of sufficient height which prevent litter spillage to the surrounding area when in use by a pet.

Another object of the present invention is to provide a pet litter container having corner closure means for the single or double folding walls when the folding walls are used as an anti-scattering component for the container when in use by a pet.

Another object of the present invention is to provide a pet litter container having outer locking corner panels for the prevention of urine leakage out of the container and for greater structural strength for the side and end panels.

Another object of the present invention is to provide a pet litter container having a re-sealable cover that also acts as a secondary moisture barrier and a catching mat to collect the scattered and ejected litter in the surrounding area when in use by a pet.

Another object of the present invention is to provide a pet litter container which is easily re-sealed for ease of disposal without the possibility of leakage, spillage or soiling by the used litter to the surrounding area when disposed of in a proper manner.

A further object of the present invention is to provide a pet litter container that can be massed produced in an automated and economical manner and is readily affordable by the consumer.

SUMMARY OF THE INVENTION

In accordance with the present invention, there is provided a disposable pet litter container having litter material therein and formed from a cardboard blank, including: a rectangular bottom wall having integrally attached opposing side panels and end panels; a pair of opposing inner and outer folding side walls being integrally attached to each of the opposing side panels; and a pair of opposing inner and outer folding end walls being integrally attached to each of the opposing end panels. In addition, the disposable pet litter container includes a pair of opposing outer locking corner panels integrally attached to each of the opposing end panels; a pair of opposing corner closure means integrally attached to each of the inner folding end walls for the formation of an anti-scattering component; and a plurality of pull tabs for unfolding the inner side folding walls and the inner end folding walls. The container is formed by connecting the outer locking corner panels of the opposing end panels to the opposing side panels. The pet litter container is filled with a predetermined amount of pet litter material and has a cover member for sealing the container.

BRIEF DESCRIPTION OF THE DRAWINGS

Further objects, features, and advantages of the present invention will become apparent upon consideration of the detailed description of the presently-preferred embodiments, when taken in conjunction with the accompanying drawings wherein.

DETAILED DESCRIPTION OF THE PREFERRED EMBODIMENT

Figure 1:
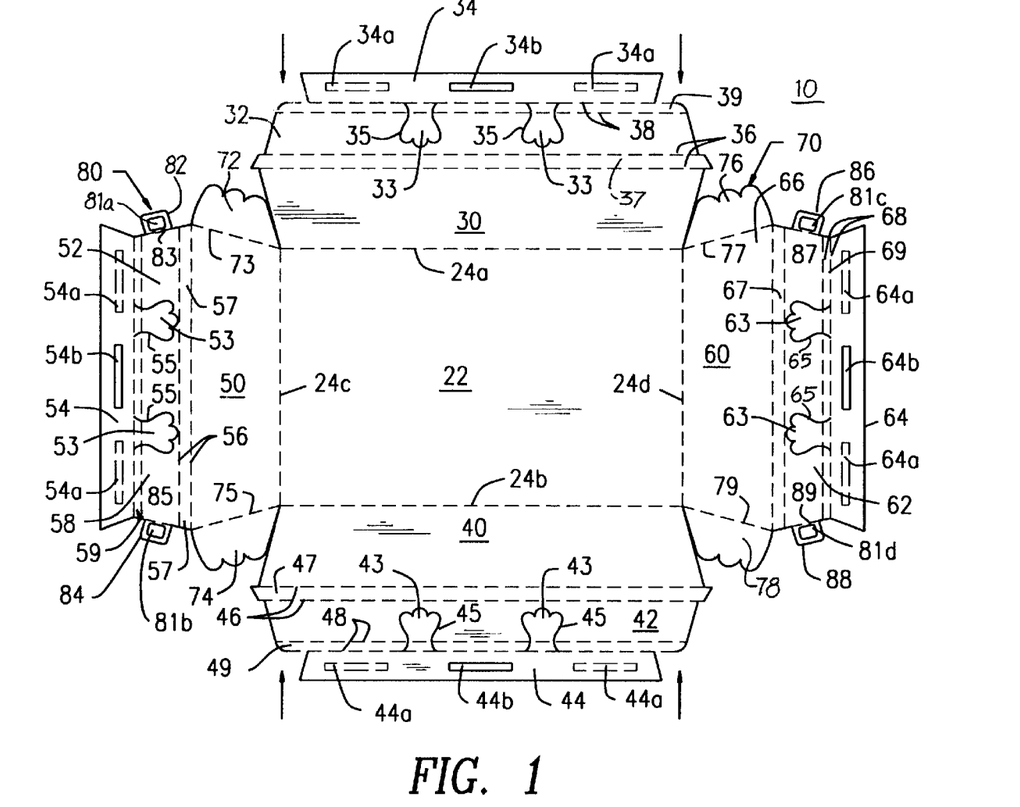
FIG. 1 is a flat layout of a cardboard blank shown from the outside view used for forming the pet litter container of the preferred embodiment of the present invention.

The preferred embodiment of the present invention provides for a pre-filled, disposable, cardboard, single use pet litter container 20 in an assembled form. The pet litter container 20, is shown in FIGS. 1 through 8, and is formed from a cardboard blank 10 and made into a five-sided box 20 containing absorbent pet litter material 14. Blank 10 which is die-stamped, as shown in FIG. 1, includes a bottom wall 22 with integrally attached first and second side panels 30 and 40, and integrally attached first and second end panels 50 and 60 having designated bottom wall fold lines 24a, 24b, 24c, and 24d, respectively. Blank 10 may be formed of either corrugated cardboard, solid cardboard, chipboard, or any equivalents thereof.

First side panel 30 includes integrally attached inner and outer folding walls 32 and 34 having designated inner and outer fold lines 36 and 38. Second side panel 40 includes integrally attached inner and outer folding walls 42 and 44 having designated inner and outer fold lines 46 and 48. First end panel 50 includes integrally attached inner and outer folding walls 52 and 54 having designated inner and outer fold lines 56 and 58. Second end panel 60 includes integrally attached inner and outer folding walls 62 and 64 having designated inner and outer fold lines 66 and 68. In addition, there are locations of adhesive or glue 16 in designated areas 34a, 44a, 54a, and 64a, (shown in dotted lines in FIG. 1) located on the inner surface of outer folding walls 34, 44, 54, and 64 which are used to adhere the outer folding walls to the inner folding walls, as follows: 32 and 34; 42 and 44; 52 and 54; and 62 and 64, to form double folding walls 31, 41, 51, and 61, as shown in FIGS. 4 through 8. There are additional locations of adhesive in designated areas 34b, 44b, 54b, and 64b located on the outer surface of outer folding walls 34, 44, 54, and 64 which are used to adhere the double folding walls to panels 130, 140, 150, and 160 of cover 120, respectively, as shown in FIGS. 5 to 8 and 18 of the drawings.

Folding wall 32 has a pair of pull tabs 33 and a pair of pull tab receiving slots 35 formed within wall 32. Folding wall 42 has a pair of pull tabs 43 and a pair of pull tab receiving slots 45 formed within wall 42. Folding wall 52 has a pair of pull tabs 53 and a pair of pull tab receiving slots 55 formed within wall 52. Folding wall 62 has a pair of pull tabs 63 and a pair of pull tab receiving slots 65 formed within wall 62.

First and second end panels 50 and 60 further include integrally attached outer locking corner panels 70, as shown in FIG. 1. First end panel 50 has a pair of outer locking corner panels 72 and 74 having designated fold lines 73 and 75, respectively. Second end panel 60 has a pair of outer locking corner panels 76 and 78 having designated fold lines 77 and 79, respectively.

First and second folding walls 52 and 62 of end panels 50 and 60 also include integrally attached corner closure tape panels 80, as shown in FIG. 1. First folding wall 52 has a pair of corner closure tape panels 82 and 84 with self-adhesive patches 81a and 81b having designated fold lines 83 and 85. Second folding wall 62 has a pair of corner closure tape panels 86 and 88 with self-adhesive patches 81c and 81d having designated fold lines 87 and 89.

Figure 2:
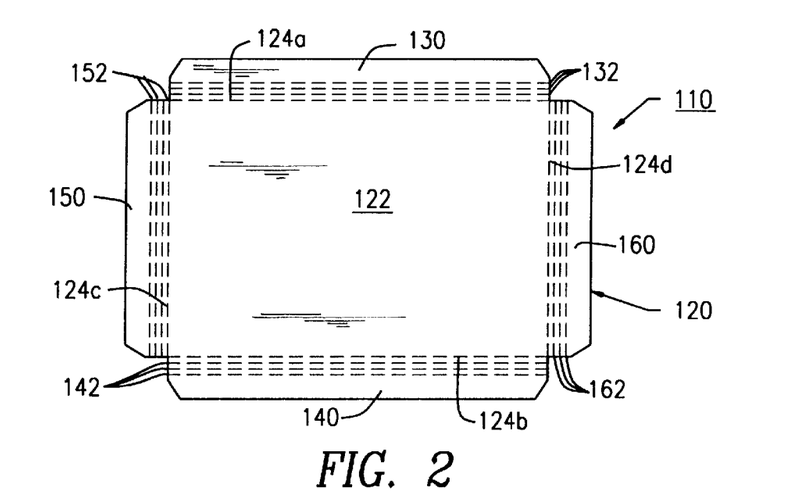
FIG. 2 is a flat layout of a cardboard blank used for the cover of the pet litter container of the present invention.

Pet litter container 20 also includes a cover 120, as depicted in FIGS. 2, 4, 5, 8, 11, and 18, for covering and sealing litter material 14. The cover 120 is formed from a cardboard blank 110 which is die-stamped, as shown in FIG. 2 of the drawings. Cardboard blank 110 for forming cover 120 includes a top or center wall 122 with integrally attached first and second side cover panels 130 and 140; and integrally attached first and second end cover panels 150 and 160 having designated topwall fold lines 124a, 124b, 124c, and 124d, respectively.

First side cover panel 130 includes designated fold lines 132; second side cover panel 140 has designated fold lines 142; first end cover panel 150 has designated fold lines 152; and second end cover panel 160 has designated fold lines 162.

It should be noted that cardboard blanks 10 and 110 may be coated on one surface which will be the inside of container 20 or the under side of cover 120. The coating is a polyethylene film, a wax, or any other water-resistant coating applied to assist in improving the resistance to moisture or water which may be encountered from pet urine.

Figure 4:
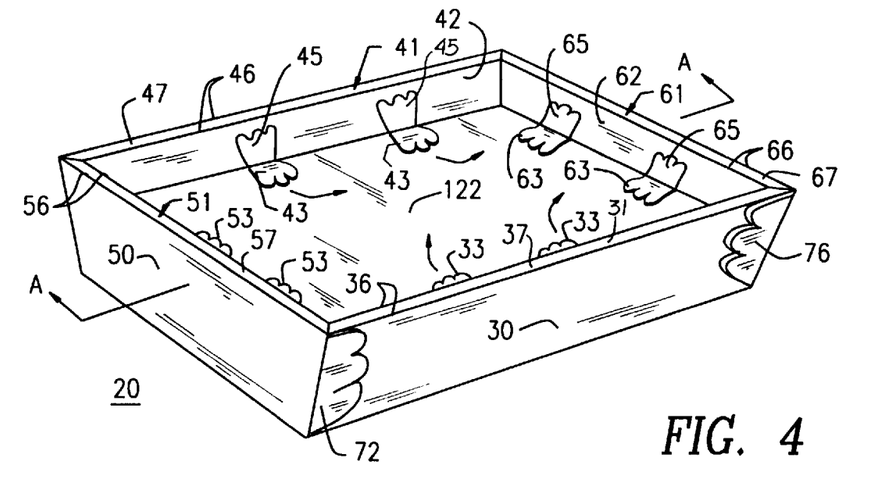
FIG. 4 is a top perspective view of the present invention showing the pet litter container in a sealed or closed state.

To assemble the pet litter container 20 from the cardboard blank 10, as shown in FIG. 4, the side and end wall panels 30, 40, 50, and 60 are folded upwardly relative to bottom wall 22 and along fold lines 24a to 24d, respectively. Next, the corner locking panels 70 of end panels 50 and 60 are folded inwardly, along fold lines 73, 75, 77, and 79, respectively; such that corner locking panels 72 and 74 are glued to one end of side panels 30 and 40; and corner locking panels 76 and 78 are glued to the other end of side panels 30 and 40, respectively. This assembly step forms the five-side container 20, which then can be filled to a predetermined level with an appropriate amount of pet litter material 14.

Figure 7:
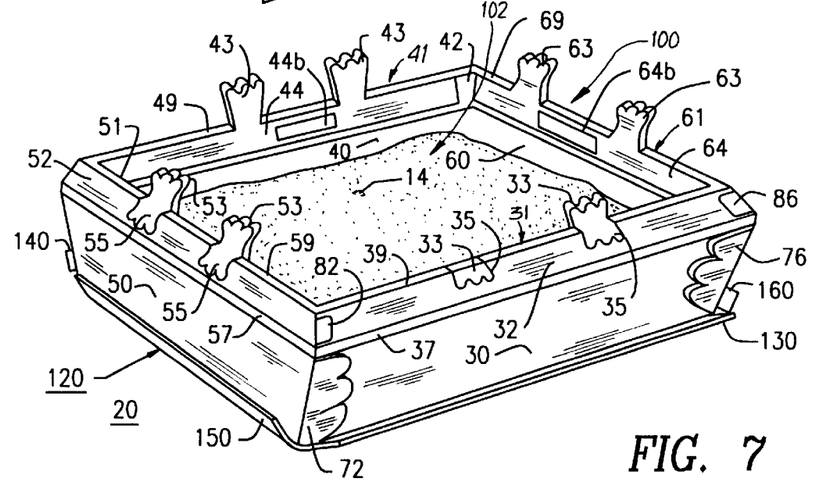
FIG. 7 is a top perspective view of the present invention showing the pet litter container set-up for use.

In the next step in the assembly of container 20, as shown in FIG. 7, the outer folding side and end walls 34, 44, 54, and 64 are folded inwardly along fold lines 38, 48, 58, and 68 which form perimeter edges 39, 49, 59, and 69. Folding walls 34, 44, 54, and 64 are then glued to the inner folding walls 32, 42, 52, and 62, respectively, to form double thick walls 31, 41, 51 and 61, respectively. Pull tabs 33, 43, 53, and 63 are then pulled out of the receiving slots 35, 45, 55, and 65 within folding walls 32, 42, 52, and 62, respectively; such that pull tabs 33, 43, 53, and 63 are in a vertical position as shown in FIG. 7.

Figure 3:
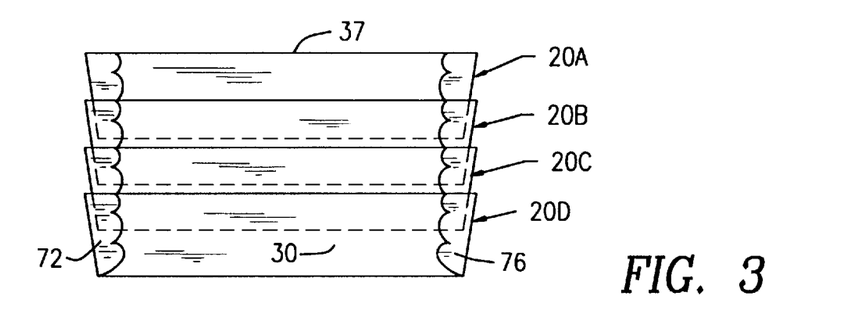
FIG. 3 is a side view of the present invention showing a plurality of the pet litter containers being nested together.
Figure 5:
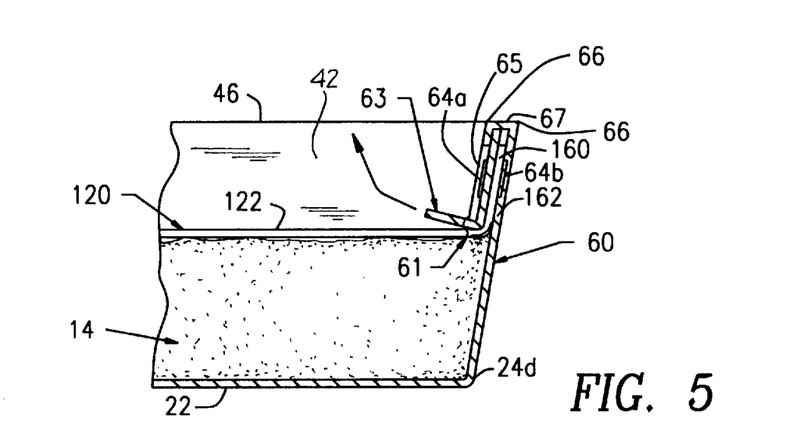
FIG. 5 is a cross-sectional view taken along line A—A of FIG. 4 of the present invention showing the interlocking of the double folded walls with the cover within the pet litter container.
Figure 6:
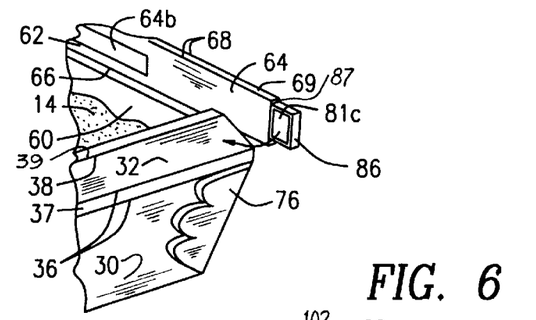
FIG. 6 is a sectional perspective view of the present invention showing the corner assembly of the pet litter container using a corner closure tape panel for locking the corner in place when the litter container is in use.
Figure 8:
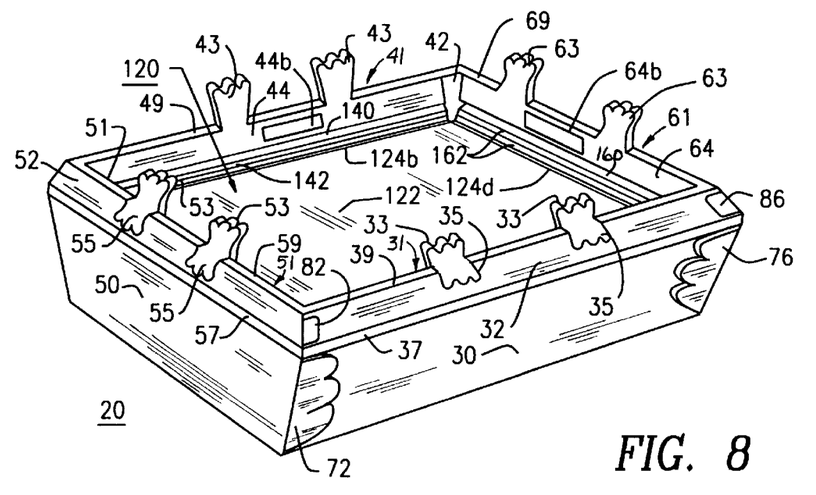
FIG. 8 is a top perspective view of the present invention showing the pet litter container resealed for disposal.

The next step in the assembly of container 20, as shown in FIG. 8, is the placing of cover 120 on litter material 14, such that wall 122 is adjacent to litter material 14 and cover panels 130, 140, 150, and 160 are upwardly folded along fold lines 124a to 124d, respectively. Cover panels 130, 140, 150, and 160 are then adjacent to the inner sides of walls 30, 40, 50 and 60, respectively. The double walls 31, 41, 51, and 61 are then folded inwardly, such that double walls 31, 41, 51, and 61 engage and overlap cover panels 130, 140, 150, and 160, respectively, as shown in FIGS. 4 and 5. The adhesive at locations 34b, 44b, 54b, and 64b adhere these members together. The pull tabs 33, 43, 53, and 63 are adjustably moved 90° to become adjacent to cover wall 122. The double walls secure the cover 120 firmly within the pet litter container 20. These double folded walls 31, 41, 51, and 61 give container 20 greater rigidity and stability of the upper wall edges 37, 47, 57, and 67 during stacking, shipping, storage and final use. With the container 20 having litter material 14 within and cover 120 firmly in place, several containers are now stackable, as shown in FIG. 3, where container 20a is nested in 20b, 20b is nested in 20c, and 20c is nested in 20d, etc.; such that the nestable containers 20 can be compactly shipped in bulk to stores for compact storage and display, or easily carried home from the store by a consumer and stored compactly.

DETAILED DESCRIPTION OF THE SECOND EMBODIMENT

Figure 9:
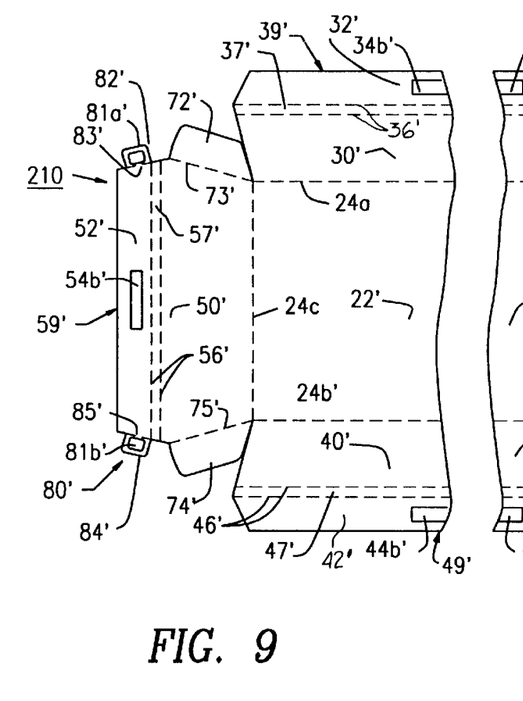
FIG. 9 is a flat layout of a cardboard blank used for forming the pet litter container of the second embodiment of the present invention.
Figure 11:
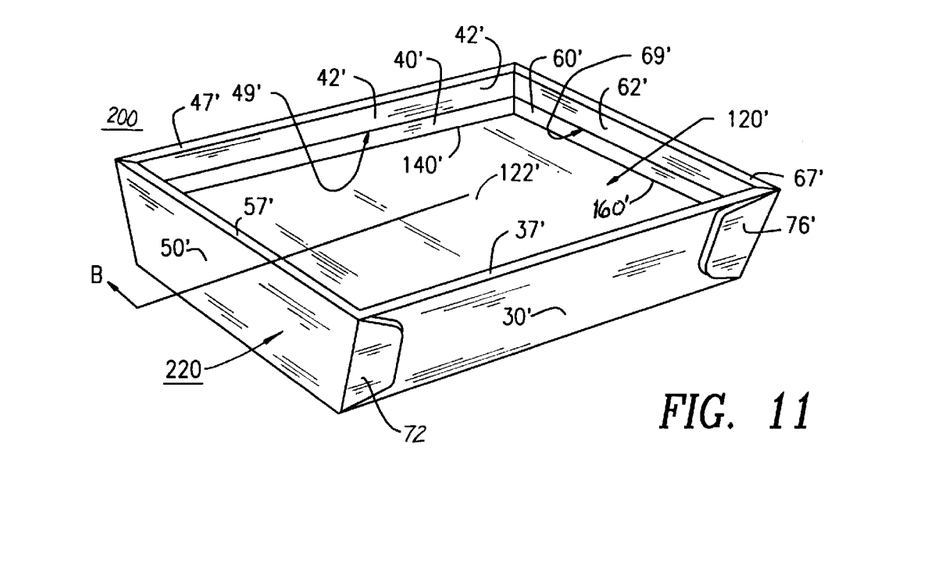
FIG. 11 is a top perspective view of the second embodiment of the present invention showing the pet litter container in a sealed or closed state.
Figure 12:
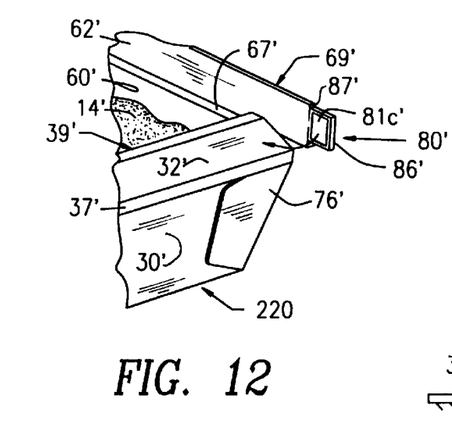
FIG. 12 is a sectional perspective view of the second embodiment of the present invention showing the corner assembly of the pet litter container using a corner closure tape panel for locking the corner in place when the litter container is in use.

An alternate embodiment 200 of the pet litter container 20 is depicted in FIGS. 9, 11, 12, and 14 of the drawings. The alternate embodiment 200 includes a pet litter container 220 which is the same as the preferred embodiment of pet litter container 20, except for the die-cut shape of cardboard blank 210. Cardboard blank 210, as shown in FIG. 9, does not have outer folding walls 34, 44, 54, and 64 as in blank 10. Container 220, as shown in FIGS. 11 and 18, has only single walls 32', 42', 52', and 62' as compared to the double walls 31, 41, 51, and 61 shown in container 20.

Figure 18:
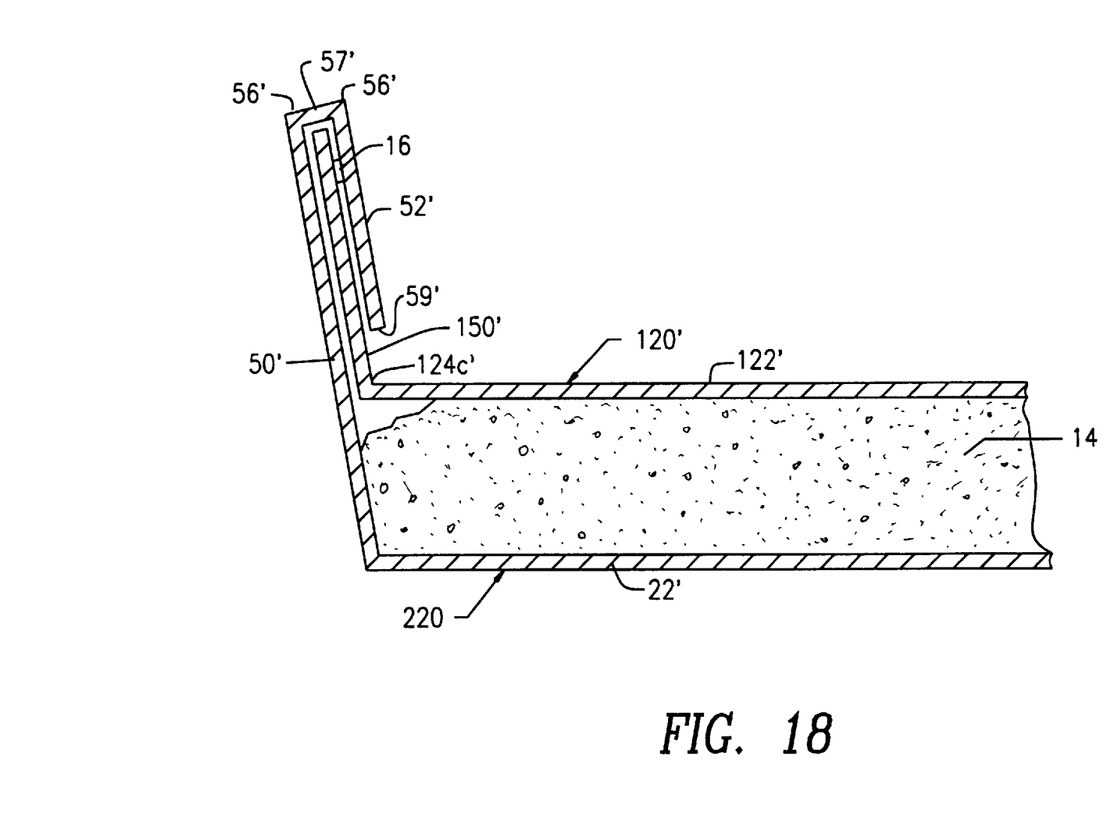
FIG. 18 is a cross-sectional view taken along line B—B of FIG. 11 of the second embodiment of the present invention showing the interlocking of the single folded wall with the cover within the pet litter container.

The assembly and formation of the alternate embodiment 220 is the same as the preferred embodiment of container 20, except the securing of cover 120' to container 220 is different, as shown in FIG. 18. When cover 120' is placed on litter material 14, the cover side panels 130', 140', 150', and 160' of cover 120' are folded upwardly to be adjacent to walls 30', 40', 50', and 60'. A spot of hot glue 16 is placed on folding walls 32', 42', 52', and 62' which are folded downwardly and inwardly, such that they engage and adhere to the cover side panels 130', 140', 150', and 160'. This secures the cover 120' firmly within the pet litter container 220, as depicted in FIGS. 11 and 18. The pet litter container 220 is now ready for shipment.

DETAILED DESCRIPTION OF THE THIRD EMBODIMENT

Figure 10:
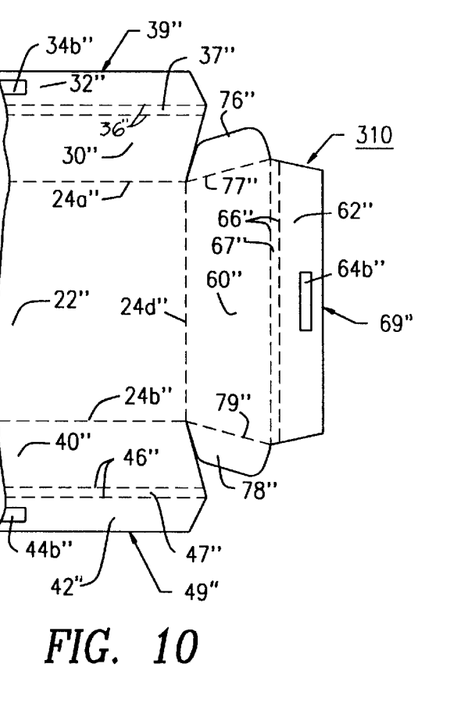
FIG. 10 is a flat layout of a cardboard blank used for forming the pet litter container of the third embodiment of the present invention.
Figure 13:
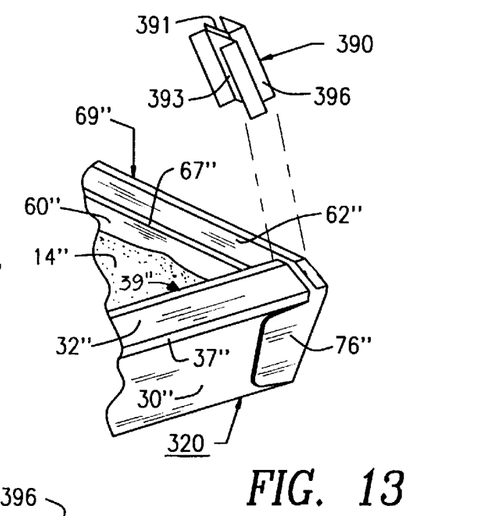
FIG. 13 is a sectional perspective view of the third embodiment of the present invention showing the corner assembly of the pet litter container using a two pronged jaw clip for locking the corner in place when the litter container is in use.
Figure 13A:
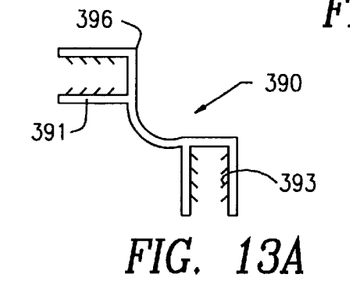
FIG. 13A is a top plan view of the corner locking means of a two pronged jaw clip.
Figures 14, 15:
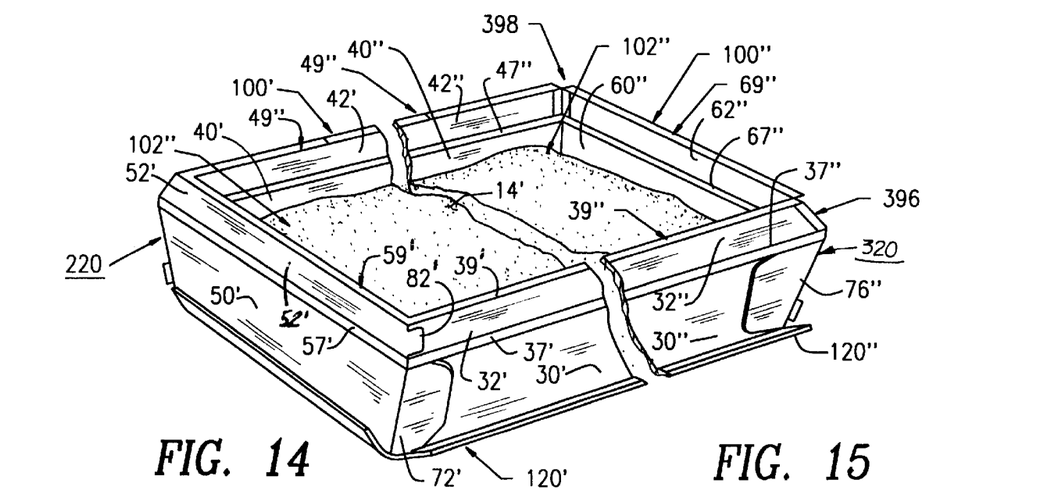
FIG. 14 is a top perspective view of the second embodiment of the present invention showing the pet litter container set-up for use.
FIG. 15 is a top perspective view of the third embodiment of the present invention showing the pet litter container set-up for use.

A third embodiment 300 of the pet litter container 220 is depicted in FIGS. 10, 13 and 15 of the drawings. The third embodiment 300 includes a pet litter container 320 formed from a cardboard blank 310 which is the same as the second embodiment of pet container 220, except for the deletion of corner closure means 80 in the form of tape panels 82', 84', 86', 88', 82', 84', 86', and 88'. In the third embodiment 300 the corner closure means 80 are in the form of two-pronged clips 390 each having integrally attached jaws 391 and 393, as depicted in FIG. 13A of the drawings. Each pet litter container 320 uses four corner closure clips 390, designated as 392 (not shown), 394 (not shown), 396 and 398, as depicted in use by FIG. 15. For example, as shown in FIGS. 13 and 15, closure clip 396 is attached to folding wall 62" via jaw 391 and also is attached to folding wall 32" via jaw 393. Each closure clip 390 is attached to a side folding wall and an end folding wall, which joins together the four corners of folding walls 32", 42", 52", and 62"when in use.

DETAILED DESCRIPTION OF THE FOURTH EMBODIMENT

Figure 16:
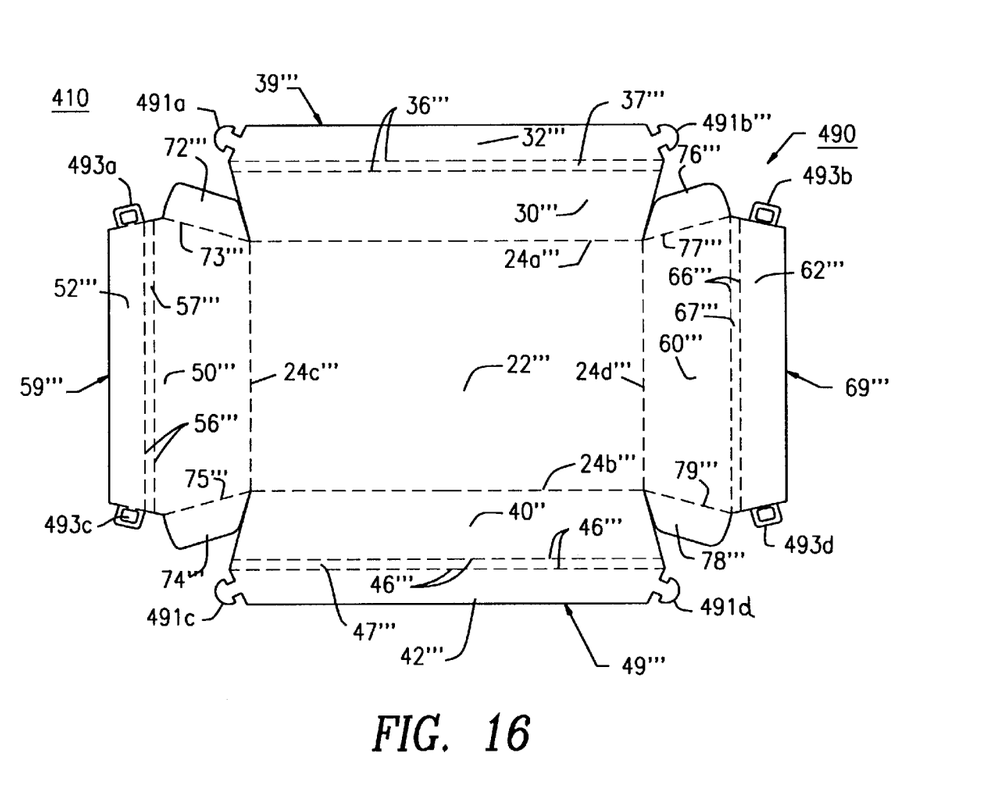
FIG. 16 is a flat layout of a cardboard blank used for forming the pet litter container of the fourth embodiment of the present invention.
Figure 17:
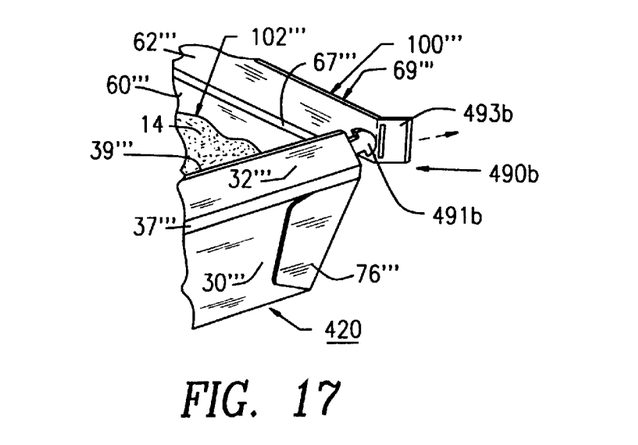
FIG. 17 is a sectional perspective view of the fourth embodiment of the present invention showing the corner assembly of the pet litter container using a tab interlock component for locking the corner in place when the litter container is in use.

A fourth embodiment 400 of the pet litter container 220 is depicted in FIGS. 16 and 17 of the drawings. The fourth embodiment 400 includes a pet litter container 420 formed from a cardboard blank 410 which is the same as the second embodiment of pet container 220, except for the deletion of corner closure means 80 in the form of tape panels 82', 84', 86', 88', 82', 84', 86', and 88'. In the fourth embodiment 400 the corner closure means are in the form of interlocking tabs 490 having a tab panel 491 and a slotted tab-receiving panel 493. Tab panels 491*a* and 491*b* are located at opposite ends of folding wall 32''' and tab panels 491*c* and 491*d* are located at opposite ends of folding wall 42'''. Slotted tab-receiving panels 493*a* and 493*c* are located at opposite ends of folding wall 52''' and slotted tab-receiving panels 493*b* and 493*d* are located at opposite ends of folding wall 62'''. For example, as shown in FIG. 17, tab panel 491*b* on folding wall 32''' is inserted into slotted tab-receiving panel 493*b* on folding wall 62''' which forms the interlocking of corner 490*b*.

DETAILED DESCRIPTION OF THE FIFTH EMBODIMENT

Figure 19:
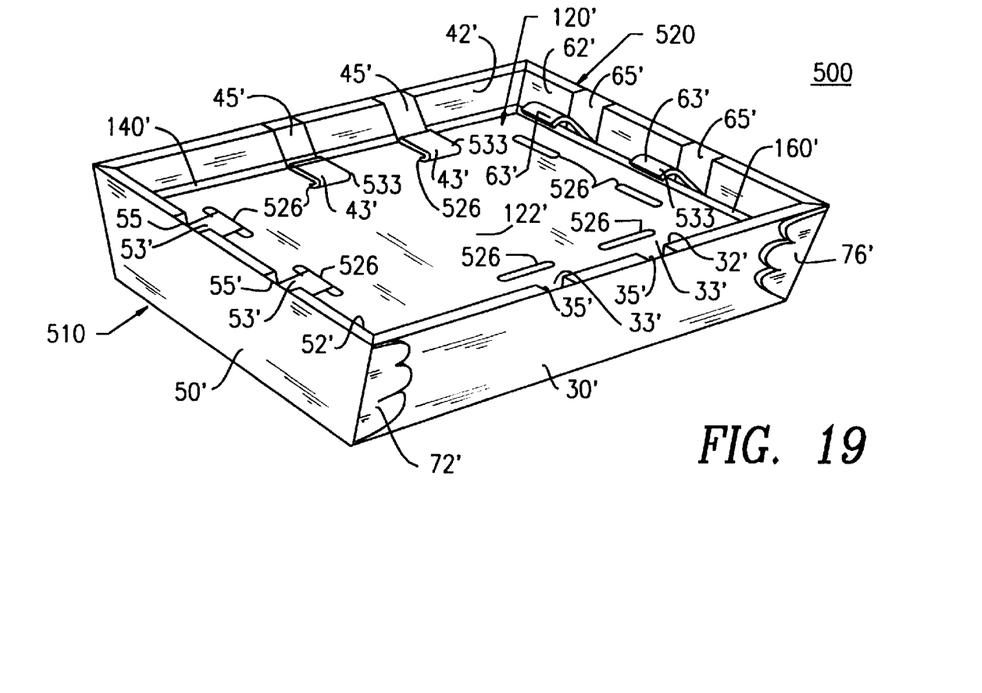
FIG. 19 is a top perspective view of the fifth embodiment of the present invention showing the pet litter container in a sealed or closed state.
Figure 20:
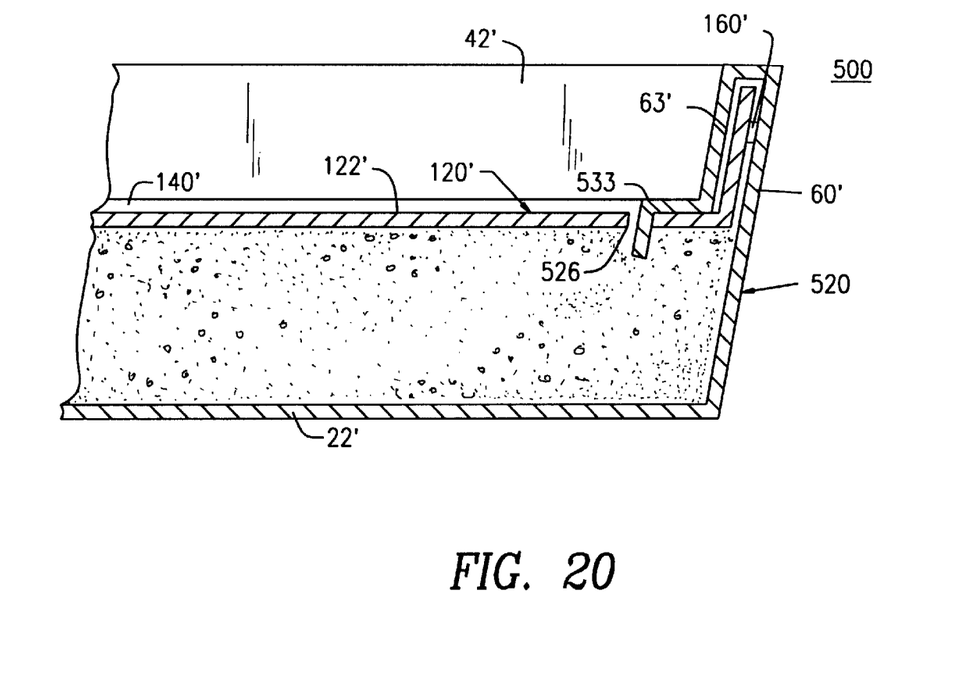
FIG. 20 is a cross-sectional view taken along line C—C of FIG. 19 of the fifth embodiment of the present invention showing the interlocking of the doubled folded walls and the cover within the pet litter container.

A fifth embodiment 500 of the pet litter container 520 is depicted in FIGS. 19 and 20 of the drawings. The fifth embodiment 500 includes a pet litter container 520 formed from a cardboard blank 510 which is the same as the preferred embodiment of pet container 20, except for the size and shape of pull tabs 33', 43', 53', and 63' and slots 526 located within cover 120'. Pull tabs 33', 43', 53', and 63' have pull tab receiving slots 35', 45', 55', and 65' formed within walls 32', 42', 52', and 62'. Pull tabs 33', 43', 53', and 63' are substantially rectangular in shape having a curved, precreased end 533 for inserting the pull tabs 33', 43', 53', and 63' within slots 526 of cover 120'.

OPERATION OF THE PRESENT INVENTION

In using container 20 of the preferred embodiment, as shown in FIGS. 4, 5, 6, and 7, the user first unseals the cover 120 from container 20 by lifting the plurality of pull tabs 33, 43, 53, and 63 such that the double-folded walls 31, 41, 51, and 61 are pulled away from cover side panels 130, 140, 150, and 160, respectively. The cover 120 is then lifted from the top of the litter material 14 from within container 20, and placed under the container. Next, the user then unfolds the double-folded walls 31, 41, 51, and 61 such that folding walls 32, 34, 42, 44, 52, 54, 62, and 64 are in a substantially vertical position. The user then connects the corner closure tape panels 82, 84, 86, and 88 via tape adhesive patches 81*a*, 81*b*, 81*c*, and 81*d* to the folding side walls 32 and 34. This forms the anti-scattering wall component 100 which prevents the ejection of litter material 14 from the interior volumetric area 102 of container 20 by the pet. The pet litter container 20 is now ready for use by a pet animal.

When the pet litter container 20 is ready for disposal the pet owner then reverses the aforementioned steps. The user un-tapes the adhesive patches 81*a*, 81*b*, 81*c*, and 81*d* from folding side walls 32 and 34. The user then places cover 120 on top of the soiled litter material 14 and then folds inwardly side and end folding walls 32, 34, 42, 44, 52, 54, 62, and 64 such that folding walls 34, 44, 54, and 64 engage and are adjacent to cover side panels 130, 140, 150, and 160, respectively, securing cover 120 to container 20, as shown in FIGS. 5 and 8 of the drawings.

The user then places the plurality of pull tabs 33, 43, 53, and 63 in a horizontal position. Container 20 is now ready for a proper disposal of the soiled litter material 14 without any leakage of urine or feces from the interior area 102 of container 20.

In using the pet litter containers 220, 320, and 420 of the alternate embodiments 200, 300, and 400, the user first unseals the cover 120' from container 220, 320, or 420 by unfolding upwardly into a vertical position the side and end folding walls 32', 32'', 32''', 42', 42'', 42''', 52', 52'', 52''', 62', 62'', and 62''' which are pulled away from cover side panels 130', 140', 150' and 160'. The cover 120' is then lifted from the top of the litter material 14 within container 220, 320, or 420, and is placed under the container. The user then connects the various corner closure means 80 to the side and end folding walls (as previously mentioned in the above description) to form the anti-scattering wall component 100', 100'', or 100''' which prevents the ejection of litter material 14 from the interior volumetric area 102', 102'', or 102''' of container 220, 320, or 420 by the pet. The pet litter container is now ready for use by a pet animal.

When the pet litter container 220, 320, or 420 is ready for disposal the pet owner then reverses the above aforementioned steps. The user undoes the various closure means 80, in the form of taped panels 82, 84, 86, and 88, or pronged clips 390, or interlocking tab components 490, from the side and end folding walls 32', 32'', 32''', 42', 42'', 42''', 52', 52'', 52''', 62', 62'', and 62''', respectively. The user then places cover 120' on top of the soiled litter material 14 and then folds inwardly side and end folding walls 32' to 62''', respectively; such that folding walls 32' to 62''' engage and adhere to cover side panels 130', 140', 150', and 160', respectively, as shown in FIGS. 11 and 18 of the drawings. Container 220, 320, or 420 is now ready for a proper disposal of the soiled litter material 14 without any leakage of the soiled contents from the interior area 102', 102'', or 102''' of container 220, 320, or 420.

ADVANTAGES OF THE PRESENT INVENTION

Accordingly, an advantage of the present invention is that it provides for a disposable pet litter container for single use having a new and improved structurally fortified design which provides nestability for a plurality of pet litter containers that are to be shipped, displayed, and stored.

Another advantage of the present invention is that it provides for a pet litter container having interior slanted walls with integrally attached single or double folding walls for providing improved stability, greater strength and nestability to the containers.

Another advantage of the present invention is that it provides for a pet litter container with double folding walls having pull tabs for better sealing of the cover lid to the interior area of the container, as well as for ease of use by the consumer.

Another advantage of the present invention is that it provides for a pet litter container with single or double folding walls of sufficient height which prevent litter spillage to the surrounding area when in use by a pet.

Another advantage of the present invention is that it provides for a pet litter container having corner closure means for the single or double folding walls when the folding walls are used as an anti-scattering component for the container when in use by a pet.

Another advantage of the present invention is that it provides for a pet litter container having outer locking corner panels for the prevention of urine leakage out of the container and for greater structural strength for the side and end panels.

Another advantage of the present invention is that it provides for a pet litter container having a re-sealable cover that also acts as a secondary moisture barrier and as a catching mat to collect the scattered and ejected litter in the surrounding area when in use by a pet.

Another advantage of the present invention is that it provides for a pet litter container which is easily re-sealed for ease of disposal without the possibility of leakage, spillage or soiling by the used litter to the surrounding area when disposed of in a proper manner.

A further advantage of the present invention is that it provides for a pet litter container that can be mass produced in an automated and economical manner and is readily affordable by the consumer.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A disposable pet litter container formed from a first cardboard blank and including a cover member formed from a second cardboard blank; comprising:
   (i) said first cardboard blank including:
      a) a bottom wall having a pair of side panels and a pair of end panels attached to said bottom wall;
      b) a pair of opposing inner and outer folding side walls attached to the upper edge of each of said opposing side panels;
      c) a pair of opposing inner and outer folding end walls attached to the upper edge of each of said opposing end panels;
      d) a locking corner panel attached to opposite ends of each of said opposing end panels;
      e) corner closure means attached to opposite ends of each of said inner folding end walls for connecting said inner folding end walls to said inner folding side walls;
      f) a plurality of pull tabs connected to said folding side walls and said folding end walls; wherein said plurality of pull tabs overlay said cover member for pulling and moving said folding side and end walls to vertical position; and for releasing said cover member from said container for use as a tray;
      g) said container formed by connecting said locking corner panels of said opposing end panels with said opposing side panels;
      h) said container being filled with a predetermined amount of pet litter material;
      i) said inner and outer folding side walls and end walls are unfolded to a vertical position and attached to each other by said corner closure means to form an anti-scattering wall for preventing the ejection of litter material by a pet and are folded to a down position for engaging and holding said removable cover member in place;
   ii) said second cardboard blank including a cover member for sealing said container having opposing side cover panels and opposing end cover panels; and
      a) means for removably adhering said folding side walls of said first cardboard blank to said side cover panels of said second cardboard blank and for adhering said folding end walls to said end cover panels so that said cover member covers said pet litter material.
      b) said cover member for providing an additional protective barrier and a tray under said container for said disposable pet litter container for collecting ejected litter material; and
      c) said cover member being resealable to recover said disposable pet litter container for disposing said container in a spill-proof manner.

2. The pet litter container in accordance with claim 1, wherein said corner closure means are in the form of tape panels.

3. The pet litter container in accordance with claim 1, wherein said corner closure means are in the form of interlocking tabs.

4. The pet litter container in accordance with claim 3, wherein one folding wall has one interlocking tab projecting therefrom and the adjacent folding wall has an opening for receiving said interlocking tab, wherein said interlocking tab passes through said opening and engages the adjacent wall to lock the two adjacent walls together.

5. The pet litter container in accordance with claim 1, wherein said corner closure means are in the form of removably attached clips.

6. The pet litter container in accordance with claim 1, wherein said first and second cardboard blanks have a moisture-proof coating made from wax, polyethylene, or metal foil.

7. The pet litter container in accordance with claim 1, wherein said inner and outer folding walls of said side panels and said end panels are folded inwardly to form double walls for additional structural strength of said container when assembled.

8. The pet litter container in accordance with claim 1, wherein said side panels and said end panels each extend outwardly from said bottom wall at greater than 90° C. to form a nestable container.

9. The pet litter container in accordance with claim 1, further including means for adhering said inner and outer folding side walls and for adhering said inner and outer folding end walls.

* * * * *